United States Patent [19]
Hsu et al.

[11] Patent Number: 5,580,092
[45] Date of Patent: Dec. 3, 1996

[54] ROLLER SKATE WHEEL WITH LIGHT PRODUCING MEANS

[76] Inventors: Cheng-Chin Hsu, No. 28, Alley 28, Lane 150, Hai Tien Road, Sec. 2; Chiu-Lan Hung, No. 32, Lane 300, Ta Hsing Street, both of Tainan; Li-Li Tsang, No. 144-1, Min Chih Road, Chieh Ting Hsiang, Kaohsiung, all of Taiwan

[21] Appl. No.: 585,773

[22] Filed: Jan. 16, 1996

[51] Int. Cl.⁶ .................................................. A63C 17/26
[52] U.S. Cl. ..................... 280/809; 280/11.19; 301/5.3; 362/78
[58] Field of Search ............................. 280/11.19, 11.27, 280/11.29, 809; 301/5.3; 362/35, 61, 42, 78

[56] References Cited

U.S. PATENT DOCUMENTS

| | | | |
|---|---|---|---|
| 2,392,634 | 1/1946 | Bierman | 301/5.3 |
| 4,298,910 | 11/1981 | Price | 280/809 |
| 4,648,610 | 3/1987 | Hegyi | 280/11.19 |

*Primary Examiner*—Richard M. Camby
*Attorney, Agent, or Firm*—Jones, Tullar & Cooper, P.C.

[57] ABSTRACT

A roller skate wheel which includes a transparent wheel mounted around a ball bearing to hold a set of lamps, a set of battery cells, and an integrated circuit board, a transparent tire mounted around the wheel, and an annular cover covered on the wheel to hold down the battery cells and the integrated circuit board, wherein the tire has a corrugated portion to refract light from the lamp; the annular cover has a slot and an insulative partition plate detachably inserted into the slot to disconnect circuit of the the battery cells before the use.

1 Claim, 3 Drawing Sheets or 5,580,092

ROLLER SKATE WHEEL WITH LIGHT PRODUCING MEANS

BACKGROUND OF THE INVENTION

The present invention relates to roller skate wheels, and relates more particularly to such a roller skate wheel which has a lighting circuit that produces a lighting effect upon movement of the roller skate.

Conventional roller skates are simply a skate with small wheels for skating on a smooth surface other than ice. In order to attract people, roller skates with light producing means have been developed. These roller skates produce light when moved. However, because the battery cells of these roller skates are electrically connected when installed, the power of the battery cells will be wasted, and used up quickly.

SUMMARY OF THE INVENTION

It is one object of the present invention to provide a roller skate wheel which produces a lighting effect when moved. It is another object of the present invention to provide a roller skate wheel with light producing means which has means to prevent waste of battery power supply when not in use. According to one aspect of the present invention, the roller skate wheel comprises a ball bearing mounted around one axle of a roller skate, a transparent wheel fixedly mounted around the ball bearing and defining a plurality of separated open chamber at an outer side, a transparent tire mounted around the wheel, an integrated circuit board mounted in one open chamber of the wheel, a plurality of lamps respectively mounted in the open chambers, a set of battery cells mounted in one open chamber of the wheel and controlled by the integrated circuit board to provide the necessary working voltage to the lamps, and an annular cover covered on the wheel over the open chambers. According to another aspect of the present invention, the tire comprises a corrugated portion consisting of a plurality of outside annular flanges raised around the outside wall of the tire and a plurality of inside annular grooves disposed around the inside wall of the tire wall corresponding to the outside annular flanges for refracting light from the lamps. According to still another aspect of the present invention, the annular cover comprises a slot corresponding to the battery cells, and an insulative partition plate detachably inserted into the slot to separate the battery cells into two disconnected groups.

DETAILED DESCRIPTION OF THE PREFERRED EMBODIMENT

Figure 1:
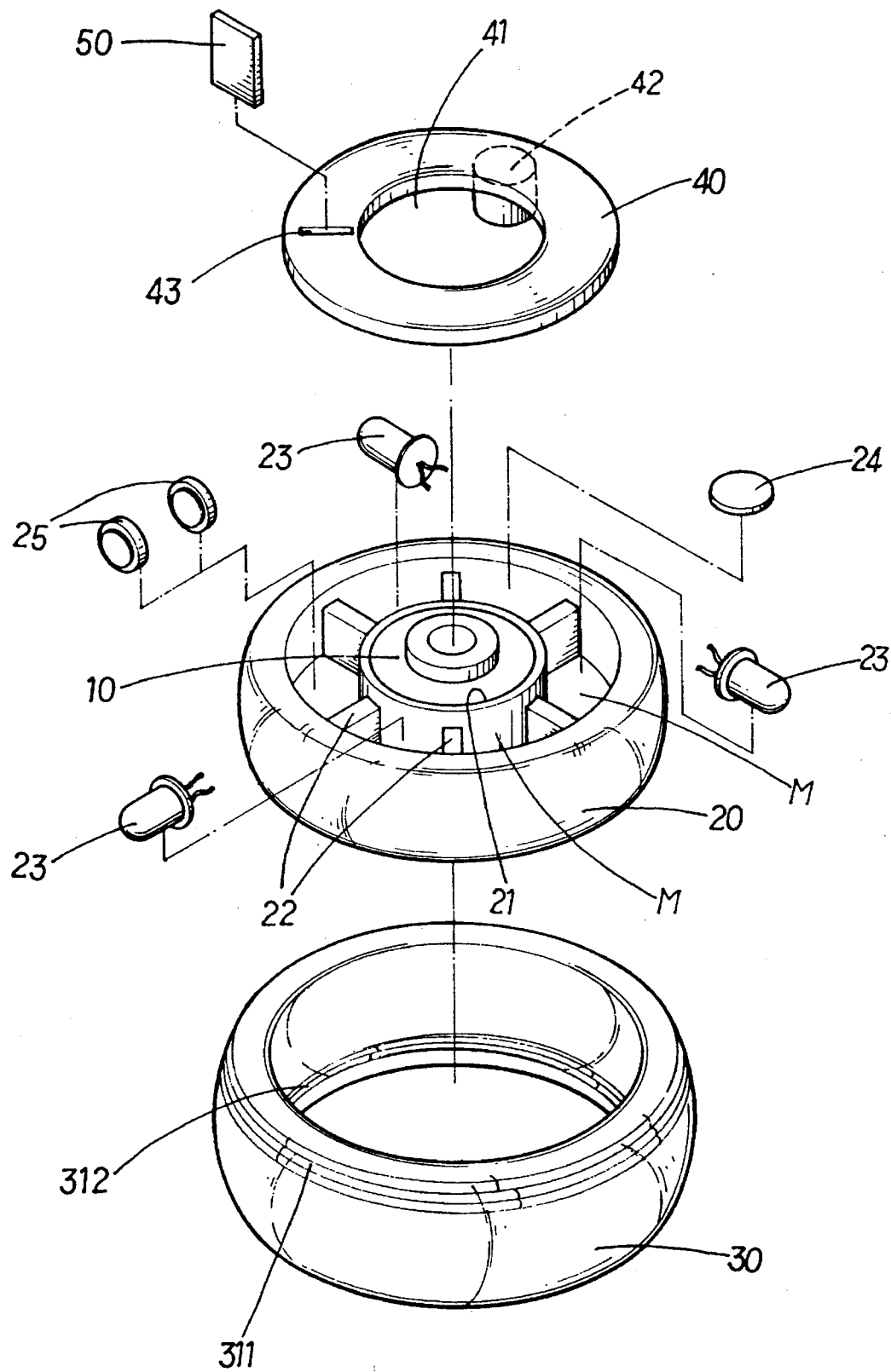
FIG. 1 is an exploded view of a roller skate wheel according to the present invention.
Figure 2:
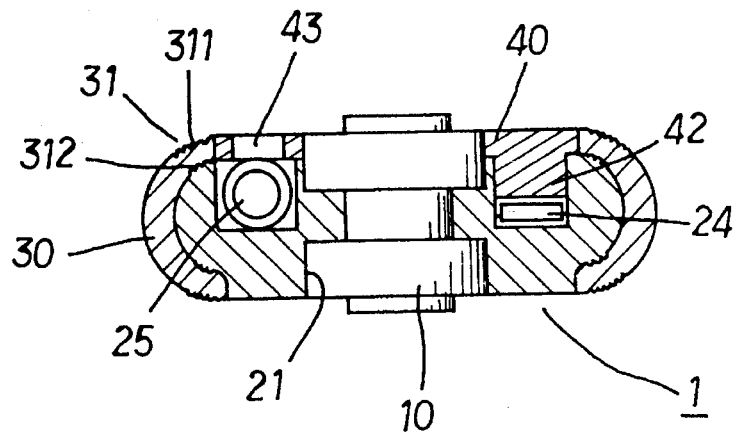
FIG. 2 is a sectional assembly view of the roller skate wheel shown in FIG. 1.
Figure 3:
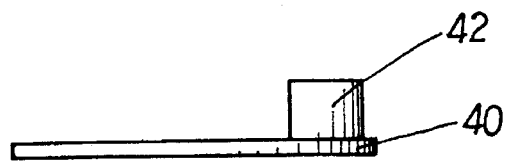
FIG. 3 is a side view of the annular cover according to the present invention.
Figure 4:
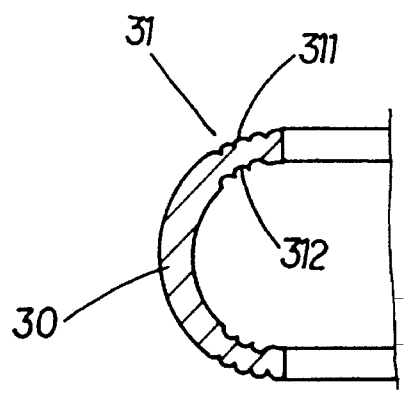
FIG. 4 is a sectional view of the tire according to the present invention.
Figure 5:
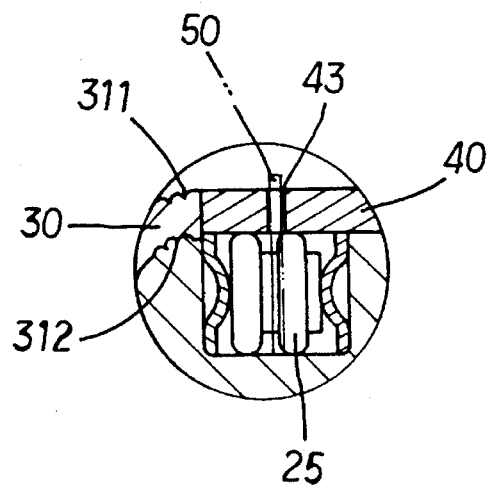
FIG. 5 is a sectional view showing the insulative partition plate inserted in between the battery cells.
Figure 6:
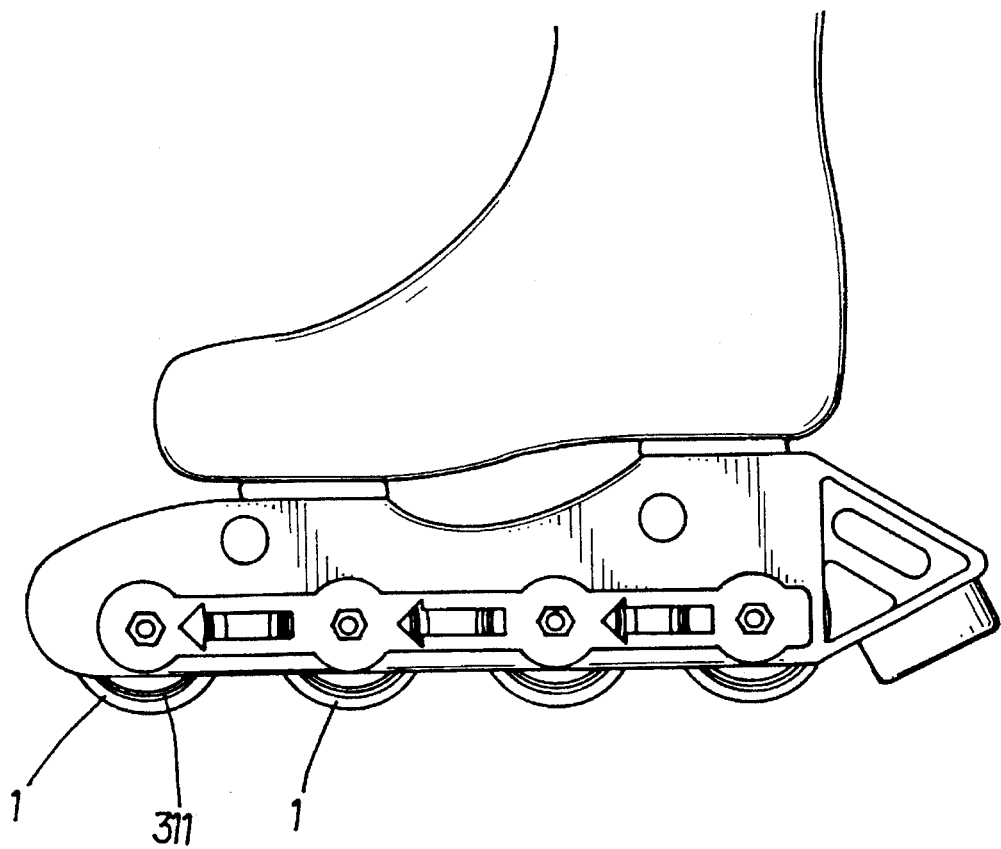
FIG. 6 is a side view of a roller skate according to the present invention.

Referring to FIGS. 1, 2, and 6, the roller skate wheel, referenced by 1, is for fastening to the sole plate of a roller skate, comprised of a ball bearing 10 mounted around one axle of a roller skate for permitting the roller skate wheel 1 to be freely rotated, a wheel 20 fixedly mounted around the ball bearing 10, a tire 30 fixedly mounted around the wheel 20, and an annular cover 40 covered on the wheel 20 around the ball bearing 10. The wheel 20 is made from transparent material, having a center hole 21, which receives the ball bearing 10, a plurality of radial reinforcing ribs 22, and a plurality of open chambers M separated by the radial reinforcing ribs 22 and covered by the cover 40. An integrated circuit board 24, a set of battery cells 25, and a plurality of lamps 23 are respectively mounted in the open chambers M and then connected together by conductors (not shown). The tire 30 is made from light penetrable material, having a plurality of outside annular flanges 311 raised around the outside wall and a plurality of inside annular grooves 312 disposed around the inside wall corresponding to the outside annular flanges 311 (see also FIG. 4). The outside annular flanges 311 and the inside annular grooves 312 form a corrugated portion 31. The annular cover 40 comprises a center opening 41 which snugly receives the ball bearing 10, a back projecting block 42 pressed on the integrated circuit board 24 (see also FIG. 3), a slot 43 corresponding to one open chamber M of the wheel 20, and an insulative partition plate 50 inserted into the slot 43 to separate the battery cells 25 into two disconnected groups (see also FIG. 5). Therefore, battery power is not wasted when the roller skate wheel 1 is not installed in the roller skate.

Referring to FIG. 6, and FIGS. 2 and 5 again, when the roller skate wheel 1 is installed in the roller skate, the insulative partition plate 50 is removed from the slot 43 of the annular cover 40, permitting the battery circuit to be closed. When the roller skate is moving, the integrated circuit board 24 will be vibrated to provide power supply to the lamps 23 intermittently, causing the lamps 23 to flash. At the same time, the corrugated portion 31 of the tire 30 refracts light from the lamps 23 in all directions to produce a fantastic lighting effect.

It is to be understood that the drawings are designed for purposes of illustration only, and are not intended as a definition of the limits and scope of the invention disclosed.

We claim:

1. A roller skate wheel of the type comprising a ball bearing mounted around one axle of a roller skate, a transparent wheel fixedly mounted around said ball bearing and defining a plurality of separated open chambers at an outer side, a transparent tire mounted around said wheel, an integrated circuit board mounted in one of said open chambers of said wheel, a plurality of lamps respectively mounted in said open chambers, a set of battery cells mounted in one of said open chambers of said wheel and controlled by said integrated circuit board to provide the necessary working voltage to said lamps, and an annular cover covered on said wheel over said open chambers, wherein: said tire comprises a corrugated portion consisting of a plurality of outside annular flanges raised around the outside wall of said tire and a plurality of inside annular grooves disposed around the inside wall of said tire wall corresponding to said outside annular flanges for refracting light from said lamps; said annular cover comprises a slot corresponding to said battery cells, and an insulative partition plate detachably inserted into said slot to separate said battery cells into two disconnected groups.

* * * * *